No. 858,102. PATENTED JUNE 25, 1907.
J. M. PHELAN.
SEWER PIPE.
APPLICATION FILED SEPT. 18, 1906.
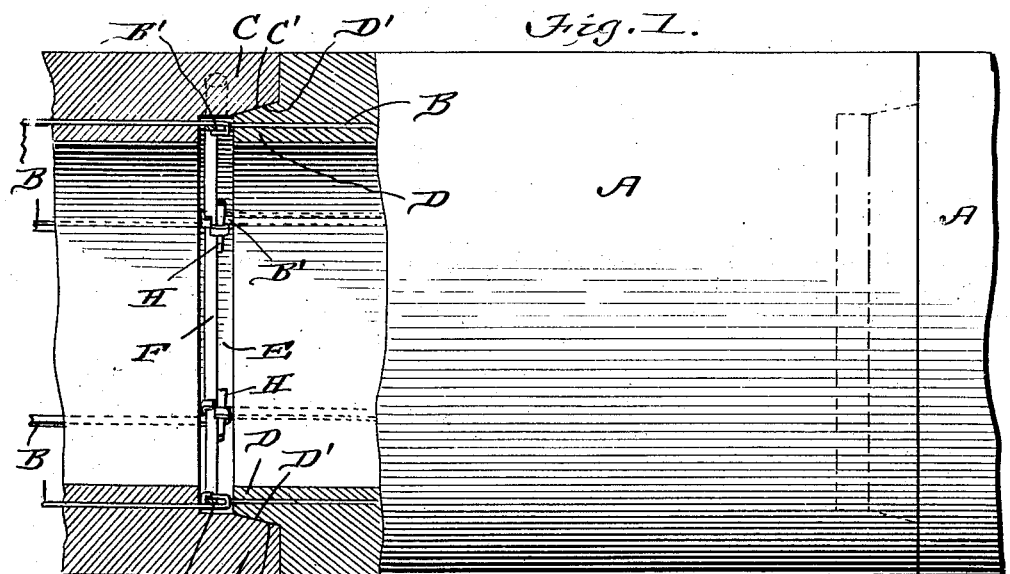
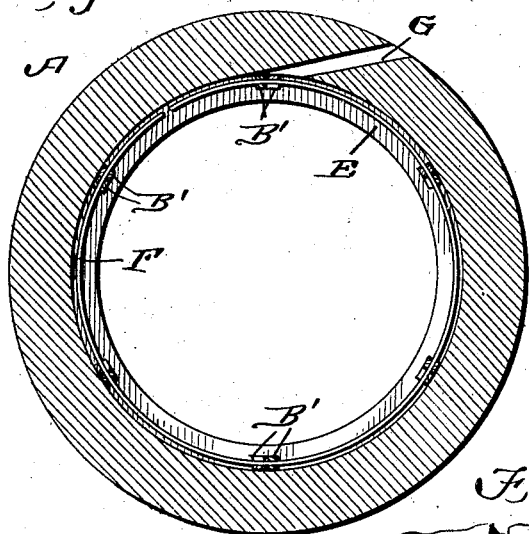
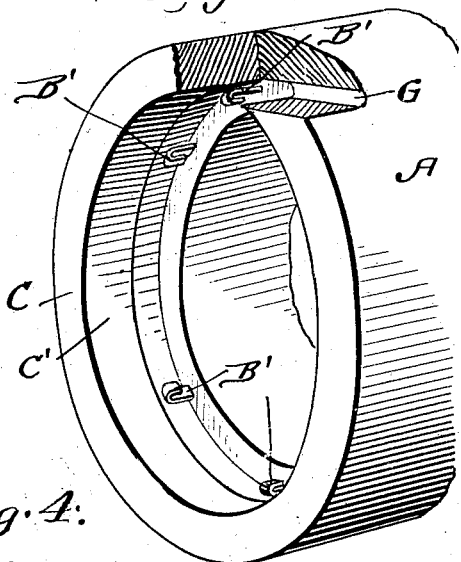
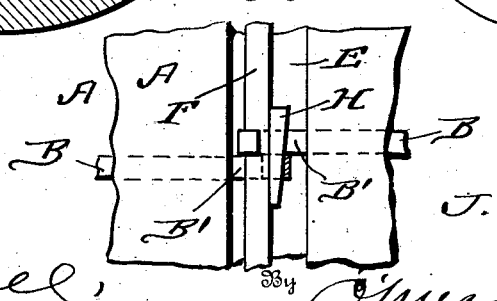
Witnesses
Inventor
J. M. Phelan
By
Attorneys

UNITED STATES PATENT OFFICE.

JOHN M. PHELAN, OF JACKSON, MICHIGAN, ASSIGNOR TO THE REINFORCED CONCRETE PIPE COMPANY, OF JACKSON, MICHIGAN, A CORPORATION OF OHIO.

SEWER-PIPE.

No. 858,102.　　　Specification of Letters Patent.　　　Patented June 25, 1907.

Application filed September 18, 1906. Serial No. 335,118.

*To all whom it may concern:*

Be it known that I, JOHN M. PHELAN, a citizen of the United States, residing at Jackson, in the county of Jackson and State of Michigan, have invented a new and useful Improvement in Sewer-Pipe, of which the following is a specification.

This invention relates generally to a reinforced concrete pipe and more particularly to an improvement upon the reinforced concrete pipe patented to me September 20, 1904, No. 770,383. In that construction of pipe the sections were locked together by means of a band passed around the exterior of the meeting ends of the pipe sections, and engaging the hooked ends of the reinforcing bars or members.

The object of my present invention is to provide a connection entirely upon the interior of the conduit thereby enabling the pipe sections to be arranged together in a ditch or trench and the connecting band inserted and locked entirely within the conduit, and with this object in view the invention consists essentially in constructing pipe sections with longitudinal reinforcing bars or members the ends of which project beyond the body portion of the pipe section and are bent back upon itself providing hooks, the pipe section at one end being flanged and provided with a collar at the opposite end, the collar of one pipe section being adapted to fit into the flanged end of the adjacent section, the flange being of greater depth than the collar thereby leaving an interior circumferential groove and into which project the oppositely disposed grooved ends of the reinforced bars or members, the flanged end of the pipe having orifice which communicates with the internal circumferential groove and through which a fastening band can be inserted for the purpose of engaging the hooked ends of the reinforcing bars or members.

The invention consists also in certain details of construction hereinafter fully described, pointed out in the claims.

In the drawings forming a part of this specification:—Figure 1 is a sectional elevation showing the manner of connecting two pipes constructed in accordance with my invention. Fig. 2 is a transverse sectional view taken on the line 2—2 of Fig. 1, the orifice being left open for the purpose of illustration. Fig. 3 is a detail perspective view partly in section showing the flanged end of the pipe and the orifice leading therethrough. Fig. 4 is a detail plan view showing the manner of locking the pipe sections together upon the interior thereof.

In making the concrete pipe or conduit section in accordance with my present invention, I mold the pipe A of concrete or any other suitable material and embedded therein are the longitudinal reinforcing bars or members B of metal, the ends B' projecting beyond the opposite ends of the pipe section said ends being bent back upon themselves as shown thereby providing hooks or hooked members, the purpose of which will appear hereinafter. One end of the pipe A is formed with a collar C, said collar being beveled as shown at C' and the opposite end of the pipe is formed with an annular flange D, which is beveled at D' to correspond with the bevel C' of the annular collar C, it being understood that the flange D fits snugly within the collar C when the pipe sections are arranged in their proper order for the purpose of constructing a sewer or conduit.

It will be noted that the collar C is somewhat deeper than the flange D so that when the ends of the pipe are brought into engagement there is produced an interior circumferential groove E at the juncture of the two sections, and it will be noted that the hooked ends of the reinforcing bars extend into this circumferential groove and in putting the pipe sections together they are so arranged that the hooked members B' register with one another as most clearly shown in the drawings and for the purpose of connecting these hooked members together, I employ a metallic band F which band is inserted through an orifice G, produced in the flanged end of the pipe section, said orifice being preferably arranged tangentially so that the metallic band can be quickly and easily threaded into the interior groove and the operator upon the interior can feed the end of the band around between the oppositely disposed hooked members and after the entire band has been so threaded into the pipe it is securely locked by means of wedges H inserted between the band and the hooked members thereby securely locking the pipe sections together and preventing all possible displacement or longitudinal movement, and the orifice G and groove E are then filled with cement or concrete and a conduit or sewer is provided with an absolutely unbroken exterior and interior. The cement in the groove will also serve to prevent any displacement of the keys. It will thus be seen that I provide an exceedingly simple and efficient means for fastening pipe sections together and entirely upon the interior thereof.

Having thus fully described my invention, what I claim as new and desire to secure by Letters Patent, is:—

1. A sewer pipe section having longitudinal reinforcing members, the ends of which are shaped for engagement with a locking band, one end of said pipe being flanged and the opposite end of the pipe provided with a collar, the collared end having an opening or orifice extending therethrough.

2. A sewer pipe section having longitudinal reinforcing bars, the opposite ends of which are shaped for engagement with a locking band, one end of said pipe being flanged, the opposite end having a collar, the collar of said pipe being deeper than the flange and an orifice extending through the collar of the pipe at its inner end for the purpose specified.

3. A sewer pipe section constructed with a beveled flange at one end, a flange at the opposite end, said collar being of greater depth than the flange, the outer portion of said collar being beveled to correspond with the bevel of the flange and a tangential orifice extending through the inner end of the collar for the purpose specified.

4. A sewer pipe section having a collar at one end and a flange at the opposite end, longitudinal reinforcing bars arranged in the pipe and having their ends projecting beyond said pipe, said ends being hooked, the collared end of the pipe having an orifice extending therethrough, and a band adapted to be inserted through said orifice and adapted to engage the hooked ends of the reinforcing bars when two sections are joined together as set forth.

5. A sewer pipe section having longitudinal reinforcing bars provided with hooked ends, said pipe having a collar at one end and a flange at the opposite end, the collar being deeper than the flange and provided with an orifice extending through its inner portion, a band adapted to be inserted through said orifice and adapted to engage the hooked ends of the reinforcing members and the wedges adapted to be inserted between the said band and hooked members for the purpose of making a tight joint when two sections are joined together, substantially as described.

6. A concrete pipe section having longitudinal reinforcing bars, the ends of which are shaped for engagement with a locking band, said pipe having a beveled flange at one end and a collar at the opposite end, said collar being of greater depth than the flange and beveled at its outer end to correspond with the bevel of the flange, the flange being adapted to fit into the collar when the pipe sections are assembled thereby providing an interior annular groove at the juncture of two pipe sections, the collared end of the pipe having an orifice which communicates with said interior groove, a band adapted to be inserted through said orifice, passed into the interior groove and brought into engagement with the ends of the reinforcing bars and wedges adapted to be inserted into the ends of said bars between the bands and said bars for the purpose specified when two sections are joined together.

JOHN M. PHELAN.

Witnesses:
JAMES M. ADAMS,
H. R. McMAHON.